United States Patent
Su

(10) Patent No.: US 10,571,741 B2
(45) Date of Patent: Feb. 25, 2020

(54) BACKLIGHT MODULE AND LIQUID CRYSTAL DISPLAY

(71) Applicant: HUIZHOU CHINA STAR OPTOELECTRONICS TECHNOLOGY CO., LTD., Huizhou, Guangdong (CN)

(72) Inventor: Zanjia Su, Guangdong (CN)

(73) Assignee: HUIZHOU CHINA STAR OPTOELECTRONICS TECHNOLOGY CO., LTD., Huizhou, Guangdong (CN)

(*) Notice: Subject to any disclaimer, the term of this patent is extended or adjusted under 35 U.S.C. 154(b) by 0 days.

(21) Appl. No.: 16/088,077

(22) PCT Filed: Aug. 23, 2018

(86) PCT No.: PCT/CN2018/101901
§ 371 (c)(1),
(2) Date: Sep. 25, 2018

(87) PCT Pub. No.: WO2019/184216
PCT Pub. Date: Oct. 3, 2019

(65) Prior Publication Data
US 2019/0302534 A1 Oct. 3, 2019

(30) Foreign Application Priority Data
Mar. 30, 2018 (CN) .......................... 2018 1 0289427

(51) Int. Cl.
*G02F 1/1335* (2006.01)

(52) U.S. Cl.
CPC .. *G02F 1/133608* (2013.01); *G02F 1/133603* (2013.01); *G02F 1/133605* (2013.01); *G02F 1/133606* (2013.01)

(58) Field of Classification Search
CPC ..................... G02F 1/133608; G02F 1/133603
See application file for complete search history.

(56) References Cited

U.S. PATENT DOCUMENTS

| 2006/0279946 | A1 | 12/2006 | Park et al. | |
| 2012/0086882 | A1 | 4/2012 | Itoh | |
| 2018/0188443 | A1* | 7/2018 | Qian | F21S 2/005 |
| 2018/0372938 | A1* | 12/2018 | Zeng | G02B 6/009 |

FOREIGN PATENT DOCUMENTS

| CN | 201909922 U | 7/2011 |
| CN | 203131615 U | 8/2013 |
| CN | 203478001 U | 3/2014 |
| CN | 103697379 A | 4/2014 |
| WO | 2011004635 A1 | 1/2011 |

* cited by examiner

Primary Examiner — Joseph L Williams
(74) Attorney, Agent, or Firm — Mark M. Friedman

(57) ABSTRACT

A backlight module and a liquid crystal display are provided. The backlight module includes a recessed back plate, a light bar, and an optical film. The optical film is disposed on the back plate to form a storage space configured for accommodating the light bar. The backboard has an opening on a side of the back plate and the opening is configured for receiving the light bar into the storage space and removing the light bar from the storage space.

20 Claims, 3 Drawing Sheets

BACKLIGHT MODULE AND LIQUID CRYSTAL DISPLAY

FIELD OF THE INVENTION

The present disclosure relates to the technical field of display, and in particular to a backlight module and a liquid crystal display.

BACKGROUND OF DISCLOSURE

A liquid crystal display (LCD) is mainly composed of a backlight module, a liquid crystal panel, and a driving circuit.

The backlight module includes optical components, such as light bars, a light guiding plate, and a diffusion plate, and also includes mechanical components, such as a back plate and a plastic frame.

In the backlight module, the light bars are generally fixed inside the backlight module. After the liquid crystal display is assembled, if one light in the light bars is broken and causes an abnormality in the liquid crystal display, it is required to disassemble the relevant components in the liquid crystal display to remove the light bar for repair. Specifically, the LCD glass is first removed, and the light bar is taken out for repair.

In this process, disassembly and assembly of the relevant components not only cause complicated operations, but also cause the components, such as the LCD glass, to be damaged.

SUMMARY OF INVENTION

An object of the present disclosure is to provide a backlight module and a liquid crystal display device, which not only simplify the operation steps of disassembling and assembling light bars, but also reduce the damage rate of the liquid crystal display.

An embodiment of the present disclosure provides a backlight module, comprising a recessed back plate, a light bar, and an optical film;

wherein the optical film is disposed on the back plate to form a storage space configured for accommodating the light bar, an opening is disposed on a side of the back plate, and the opening is configured for receiving the light bar into the storage space and removing the light bar out from the storage space.

In some embodiments, a height of the opening is H mm, and a height of the light bar is h mm, wherein $H-h>2$ mm.

In some embodiments, a width of the opening is W mm, and $(L+1)$ mm$\leq$W$\leq$(L+4) mm, wherein L is a width of the light bar.

In some embodiments, the back plate further comprises a light shielding layer, and the light shielding layer is disposed inside the opening.

In some embodiments, the backlight module further comprises a fixing member, wherein the fixing member penetrates through the back plate and connects the light bar, so as to fix the light bar on the back plate.

In some embodiments, a fixing hole corresponding to the fixing member is disposed on the back plate, a fixing recess corresponding to the fixing member is disposed on the light bar, and the fixing member is inserted into the fixing recess after penetrating through the fixing hole.

In some embodiments, the backlight module further comprises a limiting member, wherein the limiting member is disposed on a side of the back plate away from the opening, and the limiting member is configured for locating and fixing one end of the light bar.

In some embodiments, the limiting member comprises an inverted L-shaped slot, and an end of the light bar is inserted into the inverted L-shaped slot.

In some embodiments, the backlight module further comprises an attracting structure, wherein the attracting structure is disposed on a side of the back plate away from the light bar, and the attracting structure is configured for attracting the light bar, so as to fix the light bar on the back plate.

In some embodiments, the backlight module further comprises a reinforcement, wherein the reinforcement is disposed on a side of the back plate, so as to reinforce the back plate.

An embodiment of the present disclosure provides a liquid crystal display, comprising a backlight module including a recessed back plate, a light bar, and an optical film;

wherein the optical film is disposed on the back plate to form a storage space configured for accommodating the light bar, an opening is disposed on a side of the back plate, and the opening is configured for receiving the light bar into the storage space and removing the light bar out from the storage space.

In some embodiments, a height of the opening is H mm, and a height of the light bar is h mm, wherein $H-h>2$ mm.

In some embodiments, a width of the opening is W mm, and $(L+1)$ mm$\leq$W$\leq$(L+4) mm, wherein L is a width of the light bar.

In some embodiments, the back plate further comprises a light shielding layer, and the light shielding layer is disposed inside the opening.

In some embodiments, the backlight module further comprises a fixing member, and the fixing member penetrates through the back plate and connects the light bar, so as to fix the light bar on the back plate.

In some embodiments, a fixing hole corresponding to the fixing member is disposed on the back plate, a fixing recess corresponding to the fixing member is disposed on the light bar, and the fixing member is inserted into the fixing recess after penetrating through the fixing hole.

In some embodiments, the backlight module further comprises a limiting member, the limiting member is disposed on a side of the back plate away from the opening, and the limiting member is configured for locating and fixing one end of the light bar.

In some embodiments, the limiting member comprises an inverted L-shaped slot, and an end of the light bar is inserted into the inverted L-shaped slot.

In some embodiments, the backlight module further comprises an attracting structure, the attracting structure is disposed on a side of the back plate away from the light bar, and the attracting structure is configured for attracting the light bar, so as to fix the light bar on the back plate.

In some embodiments, the backlight module comprises a reinforcement, and the reinforcement is disposed on a side of the back plate, so as to reinforce the back plate.

The backlight module and the liquid crystal display device in the embodiments of the present disclosure not only simplify the operation steps of disassembling and assembling the light bar, but also reduce the damage rate of the liquid crystal display by providing the opening for receiving and removing the light bar on the side of the back plate.

In order to make the above content of the present disclosure obvious and easy to understand, the preferred embodi-

DETAILED DESCRIPTION OF PREFERRED EMBODIMENTS

Figure 1:
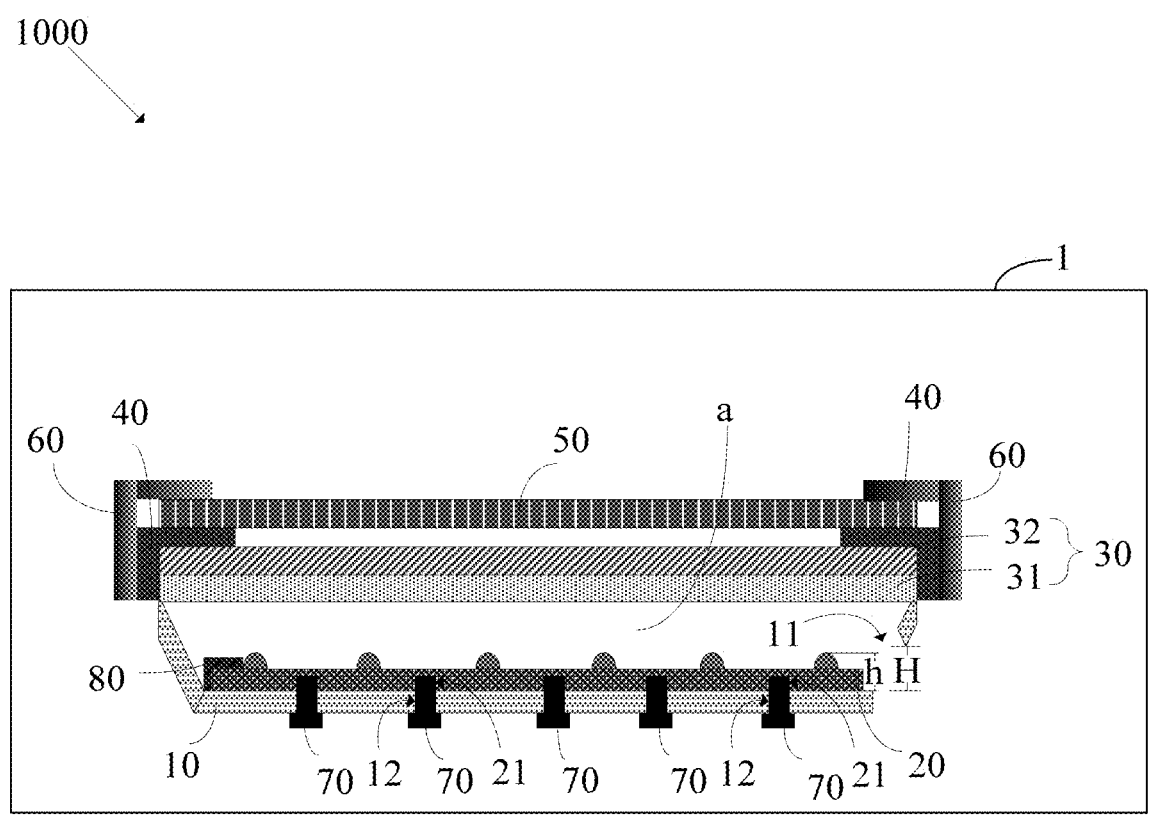
FIG. 1 is a schematic structural diagram of a liquid crystal display device in accordance with an embodiment of the present disclosure.

The following description of the embodiments with reference to the accompanying drawings is used to illustrate particular embodiments of the present disclosure. The directional terms referred in the present disclosure, such as "upper", "lower", "front", "back", "left", "right", "inner", "outer", "side surface", etc. are only directions with regard to the accompanying drawings. Therefore, the directional terms used for describing and illustrating the present disclosure are not intended to limit the present disclosure.

In the drawings, units with similar structures are indicated by the same reference number.

"An embodiment" mentioned herein means that a particular feature, structure, or characteristic described in combination with an embodiment can be included in at least one embodiment of the present disclosure. Such phrases appearing in various places in the specification do not necessarily all refer to the same embodiment, and do not refer to an embodiment being exclusive of, independent of, or alternative to other embodiments. It should be understood by those skilled in the art both explicitly and implicitly that the embodiments described herein can be combined with other embodiments.

An embodiment of the present disclosure provides a liquid crystal display. Refer to FIG. 1, which is a schematic structural diagram of a liquid crystal display in accordance with an embodiment of the present disclosure. The liquid crystal display 1000 includes a backlight module 1. Specifically, the backlight module 1 includes a back plate 10, light bars 20, and an optical film 30.

Among them, the light bars 20 may be light emitting diode (LED) light bars. In the LED light bars, LED lights are assembled on a band of a flexible printed circuit (FPC) or a printed circuit board (PCB).

As shown in FIG. 1, the optical film 30 includes a diffusion plate 31 and a reflection sheet 32 disposed on the diffusion plate 31, wherein the diffusion plate 31 is configured for converting a point light source or a line light source into a surface light source, so that the incident light is sufficiently scattered. The reflection sheet 32 is configured for reflecting the light leaked from the diffusion plate 31 to increase light utilization efficiency. In some embodiments, other optical films, such as a prism sheet, may also be disposed on the diffusion plate 31.

Figure 2:
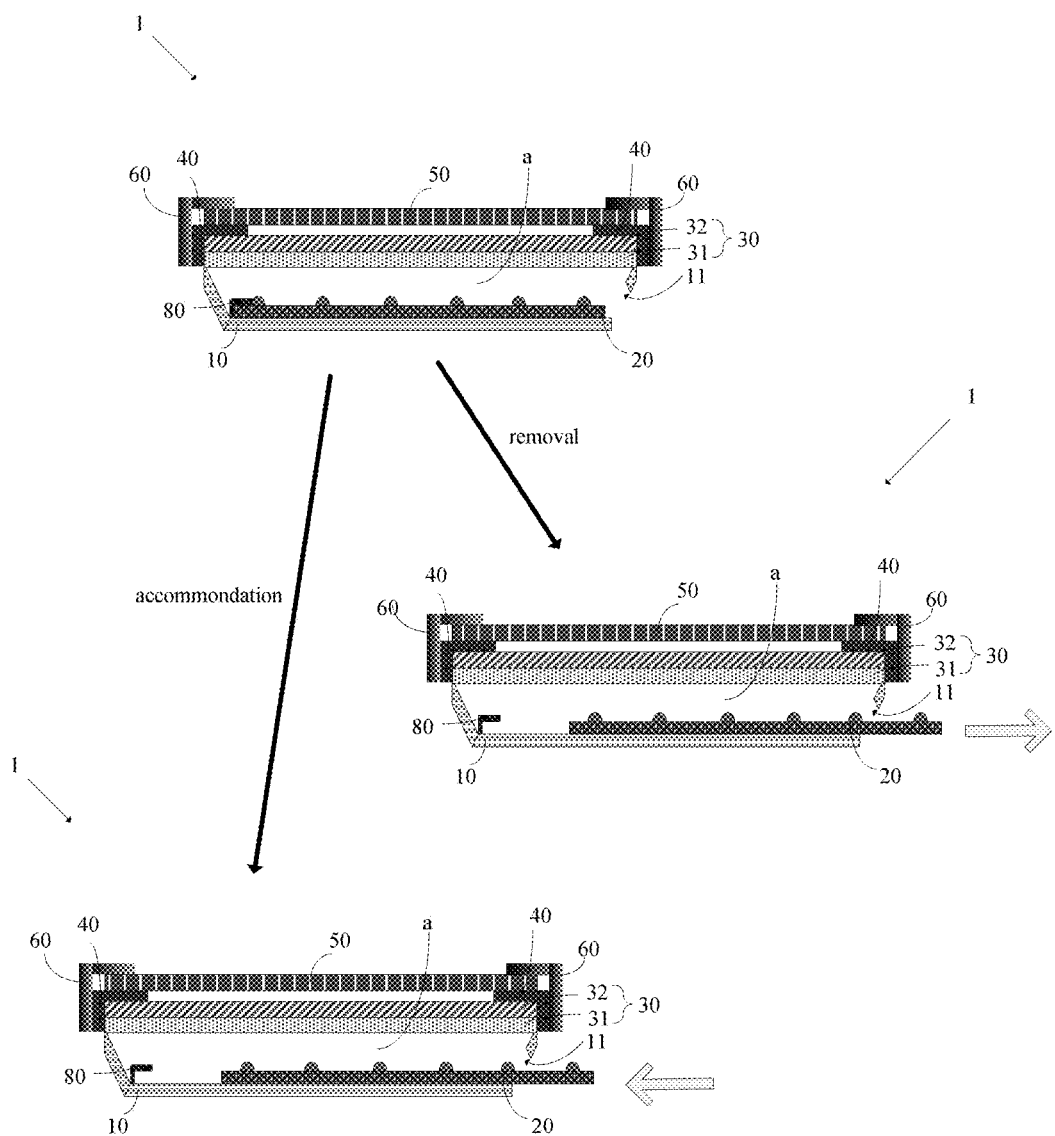
FIG. 2 is a schematic diagram of a scene for accommodating and removing a light bar in accordance with an embodiment of the present disclosure.

The back plate 10 is in a shape of a recess, and is stacked with the optical film 30. As shown in FIG. 1, the optical film 30 is disposed on the back plate 10 to form a storage space a configured for accommodating the light bars 20. An opening 11 is disposed on a side of the back plate 10, and the opening is configured for receiving the light bar 20 into the storage space a and removing the light bar 20 out from the storage space a, as shown in FIG. 2. In this way, before the light bar 20 is removed, it is not required to disassemble the optical film 30 on the back plate 10. Thus, the probability of damaging the optical film 30 is reduced.

Figure 3:
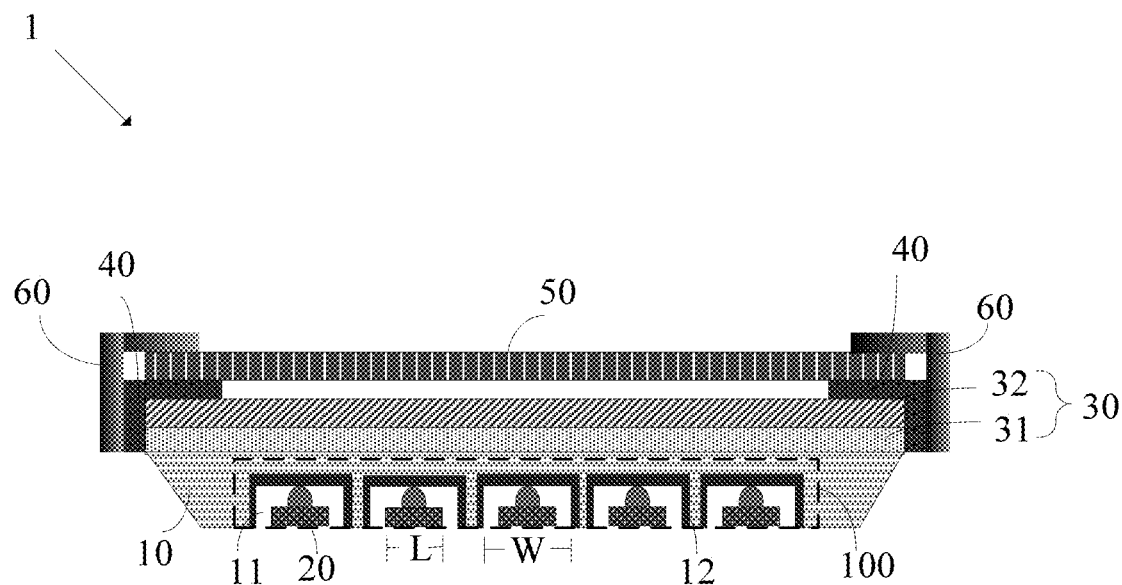
FIG. 3 is a schematic structural diagram of a backlight module in accordance with an embodiment of the present disclosure.

In order to facilitate the accommodation of the light bar 20 in the storage space a or the removal of the light bar 20 from the storage space a, it is required to set the height of the opening 11 in accordance with the height of the light bar 20. As shown in FIG. 1, if it is assumed that the height of the light bar 20 is h mm and the height of the opening 11 is H mm, the height H of the opening 11 should be greater than or equal to the height of the light bar 20, so that when the light bar 20 is being removed out or accommodated, the light bar 20 will not be pressed and damaged. Preferably, the difference (H−h) between the height H of the opening 11 and the height h of the light bar 20 is greater than 2 mm. In the same way, it is required to set the width of the opening 11 in accordance with the width of the light bar 20. As shown in FIG. 3, if it is assumed that the width of the opening 11 is W mm and the width of the light bar 20 is L mm, the width W of the opening 11 should be greater than or equal to the width of the light bar 20. Preferably, the width W of the opening 11 ranges from (L+1) to (L+4) mm.

In some embodiments, due to the rigidity of the back plate 10, the shape of the liquid crystal display can be maintained stable. However, if the number of the openings 11 on the back plate 10 is many, the stability of the back plate 10 may be reduced. Therefore, as shown in FIG. 3, a reinforcement 100 is disposed on the side of the back plate, so as to reinforce the back plate 10.

In some embodiments, as shown in FIG. 3, the back plate 10 further includes a light shielding layer 12. The light shielding layer 12 is disposed inside the opening 11, so as to prevent the backlight module 1 from leaking light. The light shielding layer 12 may be composed of materials, such as black polyester film, plastics or metals. In the process of assembling the light bar 20, after the light bar 20 is inserted into the storage space a through the opening 11, in order to prevent the light bar 20 from sliding in the storage space a, a fixing member may be further disposed to fix the light bar 20. As shown in FIG. 1, the fixing member 70 penetrates through the back plate 10 and connects the light bar 20, so as to fix the light bar 20 on the back plate 10. The fixing member 70 may be a screw. Preferably, a fixing hole 12 corresponding to the fixing member 70 is disposed on the back plate 10, and a fixing recess 21 corresponding to the fixing member 70 is disposed on the light bar 20. After the light bar 20 is received in the storage space a, so that the fixing recess 21 on the light bar 20 is aligned with the fixing hole 12 on the back plate 10, the fixing member 70 is inserted into the fixing hole 12 and inserted into the fixing recess 21.

In some embodiments, in order to accurately determine the position of the light bar 20 in the storage space a, a limiting member is also disposed. As shown in FIG. 1, the backlight module 1 further includes a limiting member 80. The limiting member 80 is disposed on the side of the back plate 10 far away from the opening 11. The limiting member 80 is configured for locating and fixing one end of the light bar 20. Specifically, the limiting member 80 may be an inverted L-shaped slot, and an end of the light bar 20 is inserted into the inverted L-shaped slot, and is caught and fixed by the L-shaped slot.

Figure 4:
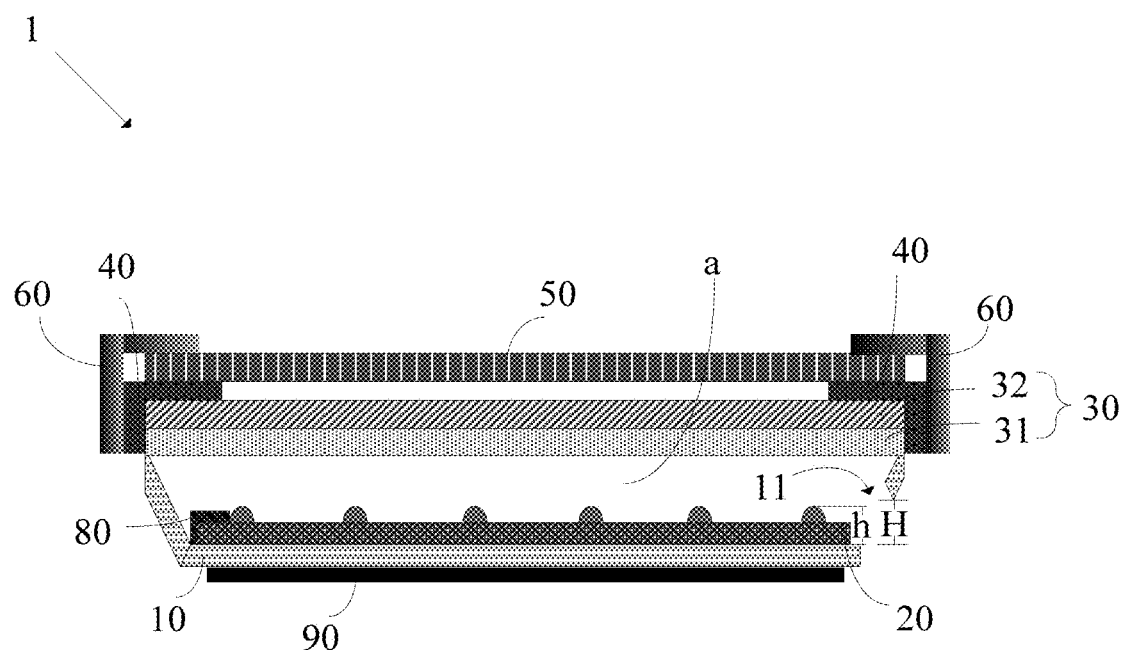
FIG. 4 is another schematic structural diagram of a backlight module in accordance with an embodiment of the present disclosure.

In some embodiments, in order to prevent the light bar 20 from sliding in the storage space a, an attracting structure may also be disposed to fix the light bar 20. Specifically, the attracting structure may be a magnet piece or a magnet bar. As shown in FIG. 4, the backlight module 1 further includes an attracting structure 90. The attracting structure 90 is disposed on a side of the back plate 10 away from the light bar 20, and the attracting structure 90 is configured for attracting the light bar 20, so as to fix the light bar 20 on the back plate 10.

As shown in FIG. 1, in some embodiments, the backlight module 1 further includes a plastic frame 40, a panel 50, and a front frame 60. The panel 50 is disposed on the optical film 30, and the plastic frame 40 is disposed between the optical film 30 and the panel 50, and between the front frame 60 and the optical film 30. The plastic frame 40 is fixed to the periphery of the back plate 10, thereby not only fixing the optical film 30 but also supporting the panel 50.

The backlight module and the liquid crystal display device in the embodiments of the present disclosure not only simplify the operation steps of disassembling and assembling the light bar, but also reduce the damage rate of the liquid crystal display by providing the opening for receiving and removing the light bar on the side of the back plate.

In summary, although the preferable embodiments of the present disclosure have been disclosed above, the embodiments are not intended to limit the present disclosure. A person of ordinary skill in the art, without departing from the spirit and scope of the present disclosure, can make various modifications and variations. Therefore, the scope of the disclosure is disposed in the claims.

What is claimed is:

1. A backlight module, comprising a recessed back plate, a light bar, and an optical film;
    wherein the optical film is disposed on the back plate to form a storage space configured for accommodating the light bar;
    an opening is disposed on a side of the back plate, and the opening is configured for receiving the light bar into the storage space and removing the light bar out from the storage space.

2. The backlight module as claimed in claim 1, wherein a height of the opening is H mm, and a height of the light bar is h mm, wherein H−h>2 mm.

3. The backlight module as claimed in claim 1, wherein a width of the opening is W mm, and (L+1) mm≤W≤(L+4) mm, wherein L is a width of the light bar.

4. The backlight module as claimed in claim 1, wherein the back plate further comprises a light shielding layer, and the light shielding layer is disposed inside the opening.

5. The backlight module as claimed in claim 1, further comprising a fixing member, wherein the fixing member penetrates through the back plate and connects the light bar, so as to fix the light bar on the back plate.

6. The backlight module as claimed in claim 5, wherein a fixing hole corresponding to the fixing member is disposed on the back plate, a fixing recess corresponding to the fixing member is disposed on the light bar, and the fixing member is inserted into the fixing recess after penetrating through the fixing hole.

7. The backlight module as claimed in claim 1, further comprising a limiting member, wherein the limiting member is disposed on a side of the back plate away from the opening, and the limiting member is configured for locating and fixing one end of the light bar.

8. The backlight module as claimed in claim 7, wherein the limiting member comprises an inverted L-shaped slot, and an end of the light bar is inserted into the inverted L-shaped slot.

9. The backlight module as claimed in claim 1, further comprising an attracting structure, wherein the attracting structure is disposed on a side of the back plate away from the light bar, and the attracting structure is configured for attracting the light bar, so as to fix the light bar on the back plate.

10. The backlight module as claimed in claim 1, further comprising a reinforcement, wherein the reinforcement is disposed on a side of the back plate, so as to reinforce the back plate.

11. A liquid crystal display, comprising a backlight module including a recessed back plate, a light bar, and an optical film;
    wherein the optical film is disposed on the back plate to form a storage space configured for accommodating the light bar,
    an opening is disposed on a side of the back plate, and the opening is configured for receiving the light bar into the storage space and removing the light bar out from the storage space.

12. The liquid crystal display as claimed in claim 11, wherein a height of the opening is H mm, and a height of the light bar is h mm, wherein H−h>2 mm.

13. The liquid crystal display as claimed in claim 11, wherein a width of the opening is W mm, and (L+1) mm≤W≤(L+4) mm, wherein L is a width of the light bar.

14. The liquid crystal display as claimed in claim 11, wherein the back plate further comprises a light shielding layer, and the light shielding layer is disposed inside the opening.

15. The liquid crystal display as claimed in claim 11, wherein the backlight module further comprises a fixing member, and the fixing member penetrates through the back plate and connects the light bar, so as to fix the light bar on the back plate.

16. The liquid crystal display as claimed in claim 15, wherein a fixing hole corresponding to the fixing member is disposed on the back plate, a fixing recess corresponding to the fixing member is disposed on the light bar, and the fixing member is inserted into the fixing recess after penetrating through the fixing hole.

17. The liquid crystal display as claimed in claim 11, wherein the backlight module further comprises a limiting member, the limiting member is disposed on a side of the back plate away from the opening, and the limiting member is configured for locating and fixing one end of the light bar.

18. The liquid crystal display as claimed in claim 17, wherein the limiting member comprises an inverted L-shaped slot, and an end of the light bar is inserted into the inverted L-shaped slot.

19. The liquid crystal display as claimed in claim 11, wherein the backlight module further comprises an attracting structure, the attracting structure is disposed on a side of the back plate away from the light bar, and the attracting structure is configured for attracting the light bar, so as to fix the light bar on the back plate.

20. The liquid crystal display as claimed in claim 11, wherein the backlight module comprises a reinforcement, and the reinforcement is disposed on a side of the back plate, so as to reinforce the back plate.

* * * * *